July 30, 1968      H. M. HOLDER      3,394,457
MAT CUTTING AND BEVELLING DEVICE
Filed Jan. 10, 1967
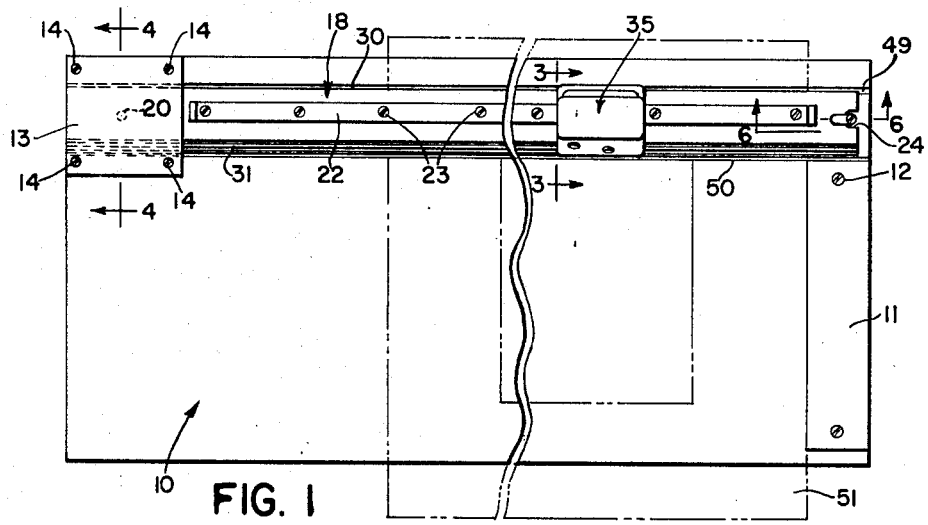
FIG. 1
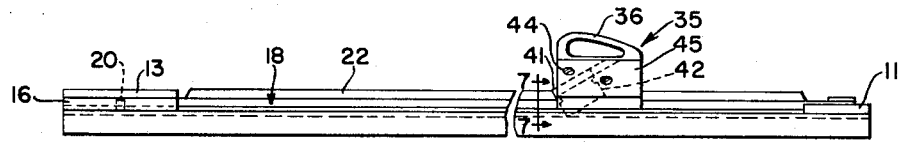
FIG. 2
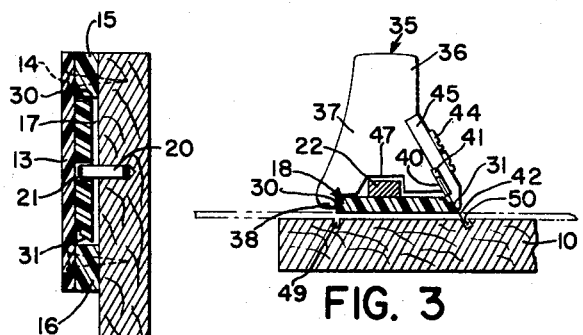
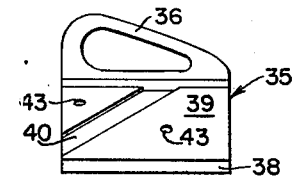
FIG. 5
FIG. 4
FIG. 3
FIG. 6
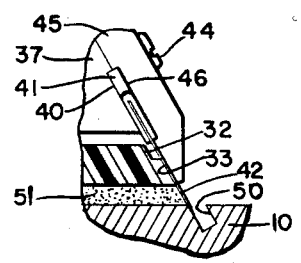
FIG. 7
INVENTOR.
HOWARD M. HOLDER
BY William A. Murray
ATTORNEY

United States Patent Office 3,394,457
Patented July 30, 1968

3,394,457
MAT CUTTING AND BEVELLING DEVICE
Howard M. Holder, Moline, Ill., assignor to
Douglas G. Adam, Sioux City, Iowa
Filed Jan. 10, 1967, Ser. No. 608,417
16 Claims. (Cl. 30—294)

ABSTRACT OF THE DISCLOSURE

A cutting and beveling device for cutting a border mat used with a framed article such as a picture or work of art. An elongated base board with a surface slot extending lengthwise of the board and a pair of plates fixed to the surface of the board having edges at right angles to one another. A blade carrier supported for longitudinal movement on one of the plates and having a blade disposed at an angle to the base board surface and with the blade's lower end extending into the slot.

Background of the invention (1) *Field of the invention.*—This invention pertains to a cutting and beveling device for cutting the inner beveled edge of a picture mat that borders a picture or work of art.

(2) *Description of the prior art.*—It has been known to provide a straight edge for guiding a cutting tool in order to bevel the inner edges of a mat. It has also been known to provide a tube or bar to guide a blade support in a straight line when beveling an edge of a mat. Structures for providing such are shown generally in U.S. Patents 611,238 and 2,065,761.

In cutting a mat for a picture frame the blade cutting the mat must be very sharp and very thin. Conventional type razor blades have been found ideal for such cutting with the exception that the blade is flexible and will wobble or flex as it moves along the mat. This leaves a ragged or scalloped edge. Once such an edge exists it is difficult and often impossible to correct or smooth the edge thereby often making it necessary to scrap the mat and cut a new mat.

Summary

The present invention pertains to a cutting and beveling device for preparing the inner beveled edge of a mat used as a border on a framed picture or other work of art. The device includes a base member or board with an elongated slot in its upper surface. Carried on the base are two plates having edges at right angles to one another. One of the plates has a beveled or inclined edge that is aligned with the slot. The latter plate also serves as a track or guide for a blade support carrying a blade inclined at the angle of the beveled edge. A cover plate clamps the blade on the support and has a lower portion depending downwardly opposite the beveled edge so as to provide a backing or support for the blade along the edge. By providing such backing a thin razor blade may be utilized and consequently a ready source of blades is available in the market.

The blade is carried on the support so that the cutting edge is also inclined to the board surface and the extreme lower tip is received in the slot in the base board surface. A single edged razor blade is used and consequently the back or rib of the blade may at times depend below the underside of the support. The top part of the beveled edge is offset from the lower part to accommodate or receive the wider ribbed portion of the blade.

The plate having the beveled edge is adapted to lie on top of a mat that is to be cut. Consequently the plate is supported on the base board for vertical movement or adjustment to accommodate several mats or mats of different thicknesses. There is also provided a latch that biases the plate downwardly so as to provide a slight pressure on the mat.

Brief description of the drawings

FIG. 1 is a plan view of the cutting and beveling device.

FIG. 2 is a side or edge view of the structure shown in FIG. 1.

FIG. 3 is an enlarged sectional view taken substantially along the line 3—3 of FIG. 1.

FIG. 4 is an enlarged sectional view taken substantially along the line 4—4 of FIG. 1.

FIG. 5 is a side view of the blade support.

FIG. 6 is an enlarged sectional view taken substantially along the line 6—6 of FIG. 1.

FIG. 7 is an enlarged sectional view taken substantially along the line 7—7 of FIG. 2.

Description of the preferred embodiment

The cutting and beveling device comprises a base member or board 10 that may be supported on a table top or work bench. The board is of fibre board construction so as to not warp to any great extent. The board is relatively long so as to accommodate mats of different sizes.

At the right hand end of the board 10 is a plastic plate 11 secured to the top horizontal surface of the board by screws 12. At the left hand upper corner of the board 10 is a square plate 13 screwed at 14 to the surface of board 10, there being provided a pair of longitudinally extending spacers 15, 16 along the edges of the plate 13 and between the plate 13 and board 10. The screws 14 also hold the spacers 15, 16 in place. The plate 13 and spacers 15, 16 form a U-shaped structure with a tunnel or groove 17 that receives one end of a guide plate 18 that, as will later become apparent, is utilized as a track. Centrally located relative to the plate 13 is a pin 20 embedded in the board 10 and projecting upwardly therefrom. An opening 21 is provided in the end of the guide plate 18 to receive the pin 20 and to thereby retain the plate 18 in the groove 17. As may best be seen by viewing FIG. 4, the plate 18 is thinner than the spacers 15, 16 and consequently there is vertical play or movement permitted by the plate 18 in the groove 17. A metal rod or rib 22 is pinned at 23 to the upper side or back of the plate 18 and prevents warping or bending of the plate 18. The plate 18 is made of a clear plastic so as to permit viewing of the work being done on the mat.

The opposite end of the plate 18 has an end groove 24 that receives a manual latch 25. The latch 25 is composed of a center pin 26 that is screwed into the board 10 and serves as a pivot for a hub portion 27 of a latch element that includes a radial arm 28 adapted to overlie the top of the plate 18. The hub 27 is hollow and a spring 29 is retained therein and bears against the head of the pin 26 so as to create a downward pressure on the latch element and to create a downward biasing force against a mat placed under the plate 18. As is clearly evident, the latch arm may be swung into and out of the overlying position to latch and unlatch the plate 18 into and out of a relatively fixed position. The hub 27 is snugly retained in the groove 24 so as to prevent the plate 18 from shifting. The latch, therefore, is primarily for the purpose of causing downward pressure on a mat that may be inserted under the plate 18. It should also be appreciated that the plate when held on the hub 27 is perpendicular to the edge of the plate 11.

The plate 18 has opposite parallel edges 30, 31, the edge 30 being perpendicular to the board surface and the edge 31 being at an inclined angle or beveled in relation to the board surface. The edge 31 has upper and lower parts or sections 32, 33 respectively, the upper section 32 being offset from the lower section 33.

Carried on the plate 18 is a blade holder 35 that is of cast plastic or metal material. The blade holder 35 has an upper handle portion 36 and a lower portion 37, the latter having a downwardly projecting lip 38 on one side providing a vertical shoulder that bears against the edge 30 and serves to guide the holder along the plate. On the opposite side of the lower portion 37 is an inclined surface 39, substantially of the same angle as and in an upward continuance with the edge 31, extending longitudinally of the holder 35. An inclined slot or groove 40 is provided in the surface 39 to receive the ribbed back 41 of a conventional type single edged razor blade 42. The slot 40 is inclined to the horizontal so as to cause the cutting edge of the blade to be inclined to the board surface.

The lower portion 37 has a pair of tapped openings 43 receiving screws 44 that fix a rectangular cover plate 45 on the surface 39. The plate 45 has a groove 46 opposite the groove 40 that also receives a side of the ribbed back 41 of the blade 42. The plate 45 clamps the blade 42 in a desired position. A lower portion of the plate 45 extends beneath the underside of the holder 35 and is disposed opposite the edge 31 to thereby provide a backing or support of the blade 42 along the inclined edge 31. The edges 30, 31 obviously serve as guide means for permitting the support 35 to move along the track or plate 18. The blade 42 projects from the holder at substantially the same angle as the edge 31 and consequently rides against the edge thereby causing the holder 35 to ride on the plate 18 along the edges 30, 31. The holder 35 has a lower recess or groove 47 that fits over the rib 22 but does not guide or track along the rib 22. Often the blade 42 will extend sufficiently below the holder 35 so that its rib or back 41 also projects below the holder 35. When such a condition exists, the lower part of the rib or back 41 is received in the upper offset section 32 of the edge 31, thereby preventing scouring or distortion of the blade.

Beneath the edge 31 and in substantial downward continuation therewith is a surface groove or slot 50 in the board 10 that extends substantially the full length thereof. The groove 50 is also inclined to the surface of the board 10 and receives the lower tip of the blade 42. The slot or groove 50 serves to stabilize the tip and blade against distortion.

Directly beneath the vertical edge 30, there is provided a vertical slot or groove 49 in the upper surface of base board 10 that receives a lower tip or end of a knife or blade that may bear against the edge 30 and serve to cut the outer vertical edges of a mat.

In utilizing the above described device, a mat 51, of any suitable material although preferably of a thick paper type board, is inserted under the plate 18. The outer edges are first cut to the desired dimensions. This may be done by bearing an edge of the mat against the edge of plate 11 and cutting along the edge 30 of the plate 18. The mat may then be turned to cause the first edge to bear against the plate 11. A second edge is then cut at right angles to the first edge by cutting the mat along the plate edge 30. All four outer edges may be cut in this manner. The inner beveled edges are then cut by bearing the outer edge of the mat against the edge of plate 11 and cutting with the holder 35 and blade 42 along the beveled edge 31 until all four of the inner beveled edges are cut. The edges of the plates 11 and 18 being perpendicular to one another will permit the beveled as well as the vertical edges of the mat 51 to meet at right angles to one another.

I claim:

1. A cutting and beveling device comprising: an elongated base member having an upper horizontal surface; an elongated first plate member extending lengthwise of the base member and having opposite parallel longitudinal edges, one edge having a surface normal to the surface of the base member and the other having a surface inclined relative to the surface of the base member; means fixing the plate member to the base member against horizontal movement but allowing the plate member to be moved in vertical spaced relation to the base member to permit insertion of a mat between the two members; a second plate member fixed to the base member on its upper surface and having an inner edge perpendicular in relation to the edges of the first plate; a blade support having an inclined surface and carried on the first plate member for longitudinal movement; a blade carried on the inclined surface of the support and having a cutting portion extending beneath the first plate member, the blade being disposed at an inclination to the base member surface, the latter inclination being of the inclination of the inclined edge of the plate member, the lower portion of the blade being disposed alongside of and engageable wtih the inclined edge of the plate member; and a slot in the surface of the base member extending lengthwise of the base and plate members for receiving the lower portion of the cutting edge of the blade.

2. The invention as set forth in claim 1 further characterized by the first plate member having a longitudinal rib extending lengthwise thereof and from its upper surface to provide lengthwise rigidity to the first plate member.

3. The invention as set forth in claim 1 in which the blade support has an underside engaging the top of the first plate member and a pair of depending shoulders engaging the respective opposite edges.

4. The invention as set forth in claim 3 in which the first plate member has a rib running lengthwise thereof for affording stiffness to the plate member and the blade support has a longitudinal groove therein receiving the rib.

5. The invention as set forth in claim 1 in which the means fixing one end of the plate member is a U-shaped structure fixed to the base member and overlying the one end of the first plate member and defining a tunnel that receives said end and permits limited movement of the end toward and away from the base member.

6. The invention as set forth in claim 1 in which the means fixing the plate member to the base member is in part a pin extending outwardly of the surface of the base member through one end of the first plate member to permit movement of the end toward and away from the surface of the base member, and means limiting movement of the first member away from the surface; and a latch at the opposite end that fixes the opposite end and biases the end toward the surface.

7. The invention as set forth in claim 1 in which the blade support carries the blade at an angle to the surface of the base member whereby the plane of the blade is inclined and the cutting edge of the blade is inclined to the surface of the base and the lowermost tip of the cutting edge is received in the slot in the surface.

8. The invention as set forth in claim 7 in which the support has a side surface inclined to the surface of the base member, and the side surface has an inclined slot recessed therein for receiving the back of a conventional single edge razor blade; and further characterized by a cover member adjustably supported on the support and adapted to clamp a single edge razor blade between the cover member and side surface.

9. The invention as set forth in claim 8 in which the cover member has a portion disposed beneath the underside of the support and the portion is closely adjacent and opposite the inclined edge whereby the tip portion of the blade is disposed between the cover member and inclined edge of the first plate member.

10. The invention as set forth in claim 9 in which the inclined edge of the first plate member is divided into a lower section and an upper section, and the upper section is offset from the lower section to receive the back of a single edged razor blade.

11. A cutting and beveling device comprising: an elongated base member having an upper horizontally disposed surface with an elongated continuous slot in the surface; an elongated plate member supported for vertical movement on the upper surface of the base member and having an inclined longitudinal edge aligned with the slot and further having longitudinally extending guide means thereon; a blade support carried on the guide means for longitudinal movement along the plate; a blade supported on the support at an incline to the surface and having a side alongside the inclined edge, the blade extending downwardly to a lower cutting portion terminating in the elongated slot; and a plate carried on the support having a surface engaging the opposite side of the blade.

12. The structure as set forth in claim 11 in which the support includes an inclined surface aligned with and in substantial continuation with the inclined edge of the plate member and the blade is carried on the inclined surface.

13. The structure as set forth in claim 12 in which the blade is supported on the support by a clamping plate that bears against the blade and clamps it against the inclined surface, and the cover plate also extends downward to be partially disposed opposite the inclined edge of the plate member.

14. The structure as set forth in claim 12 in which the slot is inclined at an angle to the surface of the base member and substantially at the same angle of inclination as the inclined edge and inclined surface on the support.

15. The structure as set forth in claim 11 further characterized by a member fixed to the upper surface of the plate and having an edge substantially at right angles to the inclined edge of the plate member.

16. The structure as set forth in claim 11 in which the plate has a second edge parallel to the longitudinal edge and substantially perpendicular to the surface of the base member, and further characterized by the base member having a second surface slot beneath the second edge for receiving a blade edge.

References Cited

UNITED STATES PATENTS

| | | | |
|---|---|---|---|
| 1,996,224 | 4/1935 | Wedekind | 30—293 X |
| 1,909,780 | 5/1933 | McCann | 30—293 |
| 1,895,754 | 1/1933 | Finkenwirth | 33—320 X |
| 2,065,761 | 12/1936 | Smith | 30—294 X |
| 2,013,893 | 9/1935 | Matthews | 30—293 X |

FOREIGN PATENTS

| | | |
|---|---|---|
| 563,622 | 11/1932 | Germany. |
| 1,343,561 | 10/1963 | France. |

JAMES L. JONES, JR., *Primary Examiner.*